July 30, 1963 E. I. LYNCH 3,099,769

CATHODE RAY TUBE SYSTEM WITH AN INDEX CONTROL

Filed Sept. 12, 1960 2 Sheets-Sheet 1

INVENTOR:
EDWARD I. LYNCH,
BY Joseph Levinson
HIS ATTORNEY.

CATHODE RAY TUBE SYSTEM WITH AN INDEX CONTROL

Filed Sept. 12, 1960 2 Sheets-Sheet 2

INVENTOR:
EDWARD I. LYNCH,
BY Joseph Levinson
HIS ATTORNEY.

1

3,099,769

CATHODE RAY TUBE SYSTEM WITH AN INDEX CONTROL

Edward I. Lynch, Syracuse, N.Y., assignor to General Electric Company, a corporation of New York Filed Sept. 12, 1960, Ser. No. 55,253
7 Claims. (Cl. 315—22)

Figure 1:
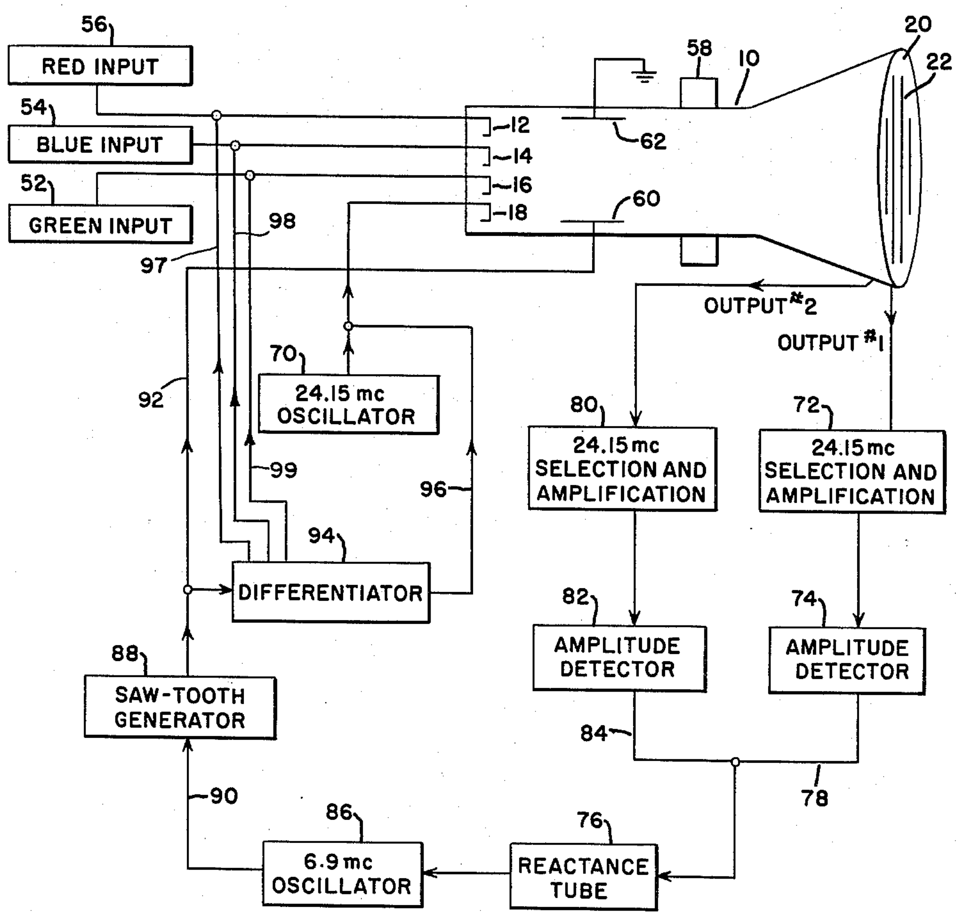

This invention relates to a cathode ray tube system and, more particularly, to a system including an indexing means for controlling the position of impingement of electron beams in a cathode ray tube.

Accurate control of the position of impingement of an electron beam on the face of a cathode ray tube is important in many applications. It is particularly important in image representation systems, such as color TV receiver displays.

The art is familiar with proposed color television image representation systems in which a plurality of laterally displaced color triads are imprinted on the tube face. Each triad consists of three vertical phosphor stripes producing light of a different primary color in response to electron beam impingement thereon.

As the electron beam is swept across the tube face in a scanning raster, the beam current is amplitude modulated in accordance with the video information to be presented on the face thereof. For fidelity of color rendition, it is, of course, necessary that the color component of the video modulation correspond with the color of the phosphor upon which the beam impinges at all positions in the scanning raster.

For such correlation, the art has proposed the generation of an indexing signal related to the beam impingement position which can be used to control the time of modulation of the beam current. Unfortunately, the development and utilization of such index signals has been unduly complicated in execution.

Further, generation of the indexing signal places a lower limit on the beam current used during the scan. Thus, the image is cast with an overall haze, and the color contrast is degraded.

It is, therefore, one object of this invention to provide an image representation system having low error illumination.

In the systems proposed by the art the individual phosphor stripes must be separated by guard bands to prevent error of color excitation. One half of the tube face was, therefore, used for non-phosphor coatings.

It is, therefore, another object of this invention to provide a cathode ray tube system in which a higher percentage of the screen area may be utilized for carrying the color phosphor triads.

Since the primary colors of the triads are scanned sequentially in the systems thus far proposed, a small percentage of the gun's capability may be used for representation of a primary color and/or white.

It is, therefore, another object of this invention to provide a cathode ray tube system having a higher efficiency of utilization of electron gun capability during image representation.

In accordance with these objects, there is provided, in a preferred embodiment of this invention, a cathode ray tube having an electron gun capable of generating four parallel closely-spaced electron beams. A grid is provided to modulate each of the beams independently. Three of the beams are modulated with color information; the fourth, an indexing beam, is modulated by a signal having a sufficiently higher frequency than the video modulation to allow detection thereof. On the face of the tube there is applied a plurality of laterally displaced color triads separated by a guard band. Each of the triads includes three stripes of luminescent material to generate a primary color in response to excitation by the impinging electron beam. The beam bundle impinges upon each triad with a beam on each phosphor stripe, and the indexing beam on the guard band.

2

Superimposed upon the color triads are two thin, electron-permeable indexing stripes. One stripe is applied generally over one side of the triad with the other stripe applied over the other half of the triad. The indexing stripes are electrically separated. All similar stripes (e.g., the left-hand stripes) are electrically coupled together to give a first electrical output. Similarly, all right-hand stripes are coupled together to generate a second electrical output.

The cathode ray tube is provided with the normal magnetic horizontal deflection system which is excited by a sawtooth at line frequency to sweep the four beams in a scanning raster. The tube is also provided with an electrostatic deflection field controlled by a recurrent sawtooth having the equivalent slope as the line deflection sawtooth. However, the electrostatic field sawtooth is opposed to the horizontal deflection field and is at a repetition frequency corresponding to the triad rate (i.e., the number of triads per line times the line frequency).

The two deflection fields interact to cause the beam bundle to be deflected from triad to triad, holding the bundle motionless on each triad for a period determined by the electrostatic sawtooth repetition rate.

To ensure that the beam bundle correctly impinges upon the triads (i.e., to ensure gun-to-phosphor correspondence), an indexing control loop is provided. The indexing loop consists of a detector to detect the differential output between the first and second electrical output signals. The frequency of the electrostatic field of the amplitude of the electrostatic sawtooth is controlled in response to the differential output to re-establish gun-to-phosphor correlation.

Figure 2:
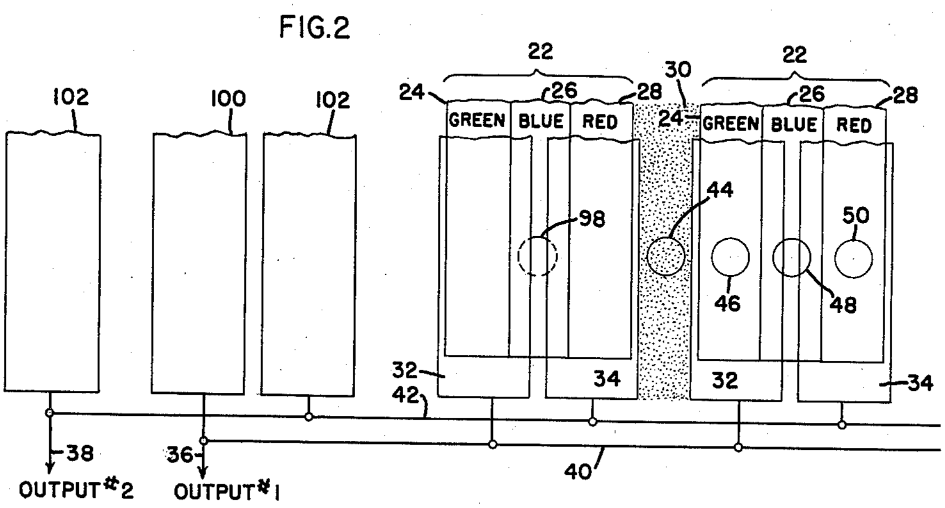
Figure 3A:
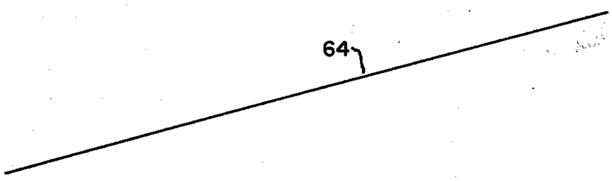
Figure 3B:
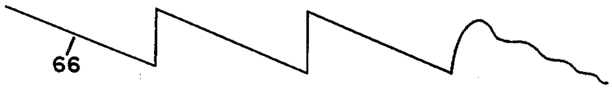
Figure 3C:
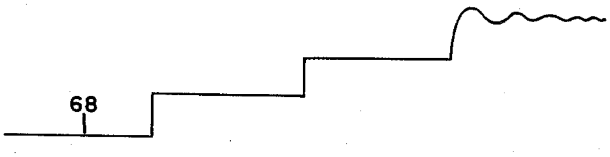

This invention will be more clearly understood by reference to the following description taken in connection with the accompanying drawings, of which:

FIGURE 1 is a schematic diagram of a cathode ray tube system in accordance with this invention;

FIGURE 2 is a plan view of the tube face shown in FIGURE 1 to enlarged scale; and FIGURE 3 is a plot of the deflection fields in which FIGURE 3*a* is a plot of the magnetic deflection field in which amplitude is plotted along the scale of ordinates and time is plotted along the scale of abscissa; FIGURE 3*b* is a plot of the electrostatic field in which amplitude is plotted along the scale of ordinates and time is plotted along the scale of abscissa; and FIGURE 3*c* is a plot of the combined fields of FIGURES 3*a* and 3*b* in which amplitude is plotted along the scale of ordinates and time along the scale of abscissa.

In FIGURE 1 there is shown a cathode ray tube 10 having an electron gun to generate four parallel, closely-spaced electron beams, each of said beams being individually modulated by an associated grid 12, 14, 16 and 18 respectively. The electron beams impinge upon the tube face 20 on which is imprinted a plurality of laterally displaced vertical phosphor triads 22. The electron gun may be of conventional form having four parallel, closely-spaced gun cylinders.

The orientation of the phosphor triads may be best understood by reference to FIGURE 2 showing the tube face to greatly enlarged scale. In FIGURE 2 there are shown phosphor triads 22 consisting of stripes 24, 26 and 28 each of which is composed of a luminous material to generate light of a predetermined primary color in response to electron beam impingement. In conventional practice the stripes 24, 26 and 28 may respectively generate green, blue and red light in response to electron beam impingement thereon. Each of the triads is separated by a guard band 30 consisting of a black non-light reflecting, non-light generating material.

The triads 22 are imprinted across the face of the tube in repetitive pattern with the stripes imprinted in consecutive order in each triad.

Superimposed over the left-hand edge of each triad is a first indexing signal generating tooth 32. Similarly, imprinted over the right-hand portion of each triad is a tooth 34. Each of the teeth comprise a thin, electron-permeable, conducting layer laid on the phosphor stripes by conventional printing techniques. In practice each of the teeth may be fabricated of an aluminum coating of sufficiently thin material as not to impede the passage of electrons therethrough. Also, secondary emitting materials and ultraviolet emitting materials may be used.

All like teeth are joined together to provide a first and second output applied respectively to the circuit over output leads 36 and 38. That is, all of the left-hand teeth 32 are coupled together and to the output 36 by lead 40. All of the right-hand teeth are coupled together and to output 38 over lead 42.

The parallel electron beams impinge upon the tube face as illustrated by the circles imprinted thereon. Alternatively, the beam plane may be inclined at an angle such as 45° with respect to the triads. Such inclination may offer advantages in some applications since the individual beams and the generating guns may be separated by greater distances. The wider separation between beams may allow use of a larger diameter beam without mutual interaction and will assist in decreasing electrostatic repulsion between beams. In either case, when properly orientated, the circle 44, representing the impingement of the indexing beam, will impinge upon the center of the guard band 30 while the green, blue and red beams, represented respectively by circles 46, 48 and 50, will impinge on the center of the green, blue and red phosphor stripes respectively.

In such condition, the beams modulated by the color content of the video signal will impinge upon the proper phosphor for image representation in color in accordance with the video information signals. The index beam will generate no output since it impinges on the guard band. As position of impingement of the four parallel beams strays from the proper impingement position, an indexing signal will be generated. For example, if the impingement position is to the left of the position illustrated, the index beam 44 will strike tooth 34 of the indexing structure to generate a corresponding signal which is applied to output 38 over lead 42. Similarly, if the impingement position is to the right of that illustrated, the index beam will strike tooth 32 to generate an index signal which is applied to output 36 over lead 40.

It will be noted that the writing beams 46, 48 and 50 will also generate a signal as they impinge upon the indexing structure. However, by proper modulation of the indexing beam, a separation between the signal of the indexing beam and that due to impingement of the main writing beam can be distinguished. Apparatus for generation and utilization of the indexing beam is best illustrated in FIGURE 1 and reference is made to FIGURES 1 and 2 simultaneously for such explanation.

The grids of the green, blue and red beams are modulated respectively from circuits 52, 54, and 56 which includes the normal circuitry for detection of the chroma and luminance signals. Matrixing of the three signals to generate the primary color components may be either external, that is, within the circuitry, or internal, that is, within the tube proper.

The beam bundle, consisting of the four electron beams, are deflected by a magnetic deflection yoke 58 generating the normal magnetic deflection field at line frequencies. In addition, there is provided electrostatic deflection field between electrostatic plates 60, 62 in the horizontal direction. The magnetic deflection field is a linear sawtooth as represented by curve 64 of FIGURE 3*a*. The electrostatic field is a recurrent sawtooth represented by curve 66 of FIGURE 3*b*. The effect of the sawtooth generated by the electrostatic field is equal but opposed to that of the magnetic field sawtooth to provide a step function represented by curve 68 of FIGURE 3*c* when the fields are combined to deflect the bundle of electron beams across the face of the tube. The waveforms on the left hand side of FIGURE 3 are ideal, while those on the extreme right are practical.

Thus, the beam bundle is stepped across the tube face striking each triad for a predetermined period and then jumping to the next triad. The electron beams are continuously modulated by the corresponding color component to generate an image representation in color on the tube face.

To prevent errors in color rendition, it is necessary that the beam bundle impinge upon the triads with the proper correlation of the color of the stripe with the color of the beam. That is, there must be gun-to-phosphor correlation throughout the scanning raster.

To provide this correlation, the differential output between output 36 and 38 is used to control the jump rate of the beam bundle. As mentioned previously, the indexing beam is modulated by an oscillator 70 which is preferably at a frequency different from the fundamental and the predominant harmonics of a signal generated by the writing beams sweeping the tube face. For example, a 24.15 mc. sinewave may be used if the line spacing and scan rate is such as to generate a 6.9 mc. signal due to scanning alone. To detect the output of 38 there is provided a narrow bandpass amplifier 72 tuned to the 24.15 mc. frequency. The index signal is applied to an amplitude detector 74 which will generate a negative going direct voltage responsive to the amplitude of the signal applied thereto which is applied to a reactance tube 76 over lead 78.

Similarly, to utilize the output 38, there is provided a bandpass amplifier 80 and an amplitude detector 82 to generate a positive direct voltage, the amplitude which is responsive to the amplitude of the applied signal, which signal is applied to reactance tube 76 over lead 84. The reactance tube 76 is used as a frequency control to vary the frequency of oscillator 86 above and below its operating frequency of 6.9 mc. The output signal from oscillator 86 is applied to a sawtooth generator 88 over lead 90 to provide the sawtooth voltage 66 which is applied to the electrostatic defletcion plate 60 over lead 92.

Referring now to FIGURES 1, 2 and 3, it can be seen that if there is gun-to-phosphor correlation, the beam bundle will be periodically deflected in a stepping motion across the tube face by the combined actions of the horizontal magnetic deflection sawtooth and the electrostatic deflection sawtooth applied at the triad rate. In such condition, no indexing signal will be generated and the image reproduction will be developed in accordance with the video information modulating the electron beams associated with each primary color. Should lack of gun-to-phosphor correlation occur (due to scan non-linearities, for example), the indexing beam will impinge upon one or the other of the indexing teeth associated with the triads. For example, if the beam bundle has not jumped far enough, the indexing beam 44 will impinge upon the tooth 32 to generate the indexing signal at output 36. After amplification and amplitude detection, the negative going signal is applied to the reactance tube to slow down the frequency of oscillator 86 and thus delay the phase of the sawtooth generated by generator 88. The delay of sawtooth phase on the electrostatic deflection plates will cause the beam bundle to jump further on the next jump to restore gun-phosphor correlation.

Similarly, if the error is in the other direction, the indexing voltage will be generated at output 38 to decrease the jump distance. Of course, when no error occurs, no index signal is generated.

Alternatively, the repetition rate of the sawtooth may be held constant with the amplitude varied to provide increase or decrease in the jump distance.

It has been found advantageous in many applications to blank the indexing beam during the jump to prevent generation of an index signal during jumping. For this purpose there is provided a differentiation circuit 94 to generate a blanking pulse which is applied to the grid 18 of the indexing beam over lead 96 in parallel with the modulation applied thereto by oscillator 70. This feature is particularly advantageous where the teeth of the indexing generator are of unequal widths. If the comb teeth are of equal width, equal positive and negative voltages will result at the reactance tube grid and no correction will be initiated. A blanking pulse can also be used to blank the writing beams, decreasing error illumination. Blanking pulses are shown coupled to electrodes 12, 14, and 16 via lines 97, 98 and 99 respectively.

To prevent failure of gun-to-phosphor correlation at the start of a line, which might occur if the indexing beam straddled the right- and left-hand comb teeth as illustrated by the dotted outline 98, it is advantageous to provide a change in the triad spacing at the extreme edge of the tube face. For example, teeth 100 and 102 corresponding respectively to teeth 32 and 34 would be placed on the tube face with a change of spacing between the sets of teeth at the edge and the spacing throughout the remainder of the tube face. Thus, even if the beam bundle incorrectly hangs at a false null, the change of spacing will ensure generation of a corrective indexing signal. Since the only purpose of this change of spacing is to prevent locking on a false null, the edge of the tube is preferably provided with an area in which only the indexing generation teeth are provided, the phosphor stripes being omitted.

In this manner, there is provided a system having several advantages over the prior art. Since the index stripe does not generate light, low error illumination by the indexing beam is provided. Only 25% of the screen area is lost to provide the index stripes. Further, improved efficiency and reduction in gun current capability requirements are afforded since the tube will be, for example, 90% efficient with a 10% of triad time assumed for jumping. The high efficiency will be maintained for white and primary color reproduction whereas sequencing one-gun systems must employ time sharing of the beam on such reproductions.

This invention imay be variously modified and embodied within the scope of the subjoined claims.

What is claimed is:

1. A cathode ray tube system having a cathode ray tube including a plurality of laterally displaced color triads imprinted on the tube face, each of said triads being separated by a non-light emitting guard band, and an electron gun adapted to generate a beam bundle of parallel beams, one of said beams being an indexing beam, a first indexing comb having the teeth thereof positioned adjacent said guard bands on one side thereof, a second indexing comb having the teeth thereof positioned adjacent said guard bands on the other side thereof, deflection means to cause said beam bundle to jump in a plurality of jumps across the tube face, means to derive a first indexing signal from said first comb upon impingement of said index beam thereon, means to derive a second indexing signal from said second comb upon impingement of said index beam thereon, and means responsive to said first and second signals to vary the distance of each jump of the bundle until coincidence of the index beam and the guard band is achieved.

2. A system in accordance with claim 1 in which the index beam is modulated by a signal of predetermined frequency and in which said signal deriving means includes amplifiers tuned to said frequency.

3. A system in accordance with claim 1 in which said deflection means comprises a first deflection system to sweep said bundle across said screen at line frequency and a second deflection system bucking said first system to stop the bundle sweep at triad frequency.

4. A system in accordance with claim 3 which includes means responsive to the difference between said first and second signals for changing the frequency of said second deflection system.

5. A system in accordance with claim 1 which includes means for blanking said index beam during the jump interval.

6. A system in accordance with claim 1 which includes means for blanking said beam bundle during the jump interval.

7. A system in accordance with claim 1 wherein said means for varying the jump distance of the bundle includes means responsive to a difference between said first and second signals.

References Cited in the file of this patent

UNITED STATES PATENTS

| | | |
|---|---|---|
| 2,757,313 | Miller | July 31, 1956 |
| 2,962,546 | Thompson | Nov. 29, 1960 |